United States Patent Office 2,773,072
Patented Dec. 4, 1956

2,773,072

STEROID HYDROLYSIS

Milton E. Herr, Kalamazoo Township, Kalamazoo County, and Frederick W. Heyl, Kalamazoo, Mich., assignors to The Upjohn Company, Kalamazoo, Mich., a corporation of Michigan No Drawing. Application June 17, 1953,
Serial No. 362,404

8 Claims. (Cl. 260—397.3)

This invention relates to a novel process for the hydrolysis of certain steroid 3-enamines, more particularly the hydrolysis of 3-enamines of A ring-saturated 3-keto steroids, by mixing them with an essentially neutral organic solvent containing water, the provision of said process being an object of the present invention. Other objects will be apparent to those skilled in the art to which this invention pertains.

According to the present invention, a steroid 3-enamine as herein defined is hydrolyzed by mixing with an essentially neutral organic solvent containing water to produce a secondary amine and a steroid having a saturated A ring and a 3-keto group.

Starting steroids of the present invention are 3-tertiary amino steroids having an unconjugated double bond alpha to the amino nitrogen atom, i. e., 3-enamines of A ring-saturated 3-keto steroids. These compounds can be produced by reacting an A ring-saturated steroid having a 3-keto group with a secondary amine, preferably a cycloalkylene amine, e. g., piperidine or pyrrolidine. The reaction is usually catalyzed by the addition of an acidic reaction catalyst and the reaction is promoted by the removal of the water of reaction. The term steroid when used herein includes those A ring-saturated 3-keto cyclopentanopolyhydrophenanthrene compounds with or without a 17-side chain and angular methyl groups, e. g., compounds of the estrane, 13-normethylestrane, andostrane (which includes the etiochloanes), pregnane (which includes the allopregnanes) and cholane series.

The hydrolysis of the starting steroid 3-enamines of the present invention by mixing them with an essentially neutral organic solvent containing water may be illustrated as follows:

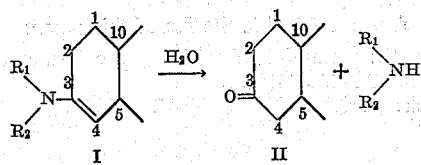

wherein $R_1$ and $R_2$ are, for example, alkyl, aralkyl, alkenyl, and are alike or different, or together represent a ring structure which is cycloalkyl, cycloalkenyl, heterocyclic or the like, e. g., with the nitrogen atom represent a morpholine, piperidyl, pyrrolidyl, pyrrolyl, or the like, amino group. The numbers on the partial steroid structure illustrated are carbon atom numbers. Alternatively the double bond in the A ring of the starting 3-enamines may be in the 2(3) position.

The present invention has been reported by us in J. Am. Chem. Soc., 75, 1918 (1953). Surprisingly, although 3-enamines of $\Delta^4$-3-keto steroids are extremely resistant to hydrolysis in the absence of a hydrolysis catalyst, we have found that the 3-enamines of A ring-saturated steroids hydrolyze readily when dissolved in an essentially neutral organic solvent containing water, even in the absence of a hydrolysis catalyst. This is particularly surprising in view of Mannich and Davidson, Berichte, 69B, 2106 (1936), who prepared some non-steroidal $\alpha,\beta$-unsaturated amines which were unaffected by aqueous alkali or water and which required aqueous acid to affect the hydrolysis.

An example of the hydrolysis which comprises the present invention is given in our journal article wherein the 3-pyrrolyidyl enamine of cholestan-3-one was readily hydrolyzed in aqueous 95 percent ethanol at its refluxing temperature. Since the starting 3-enamines of the present invention are hydrolyzed in an essentially neutral organic solvent, the reaction can be performed without affecting other groups which may be present in the steroidal molecule and which would be destroyed or otherwise affected by a hydrolysis in the presence of a hydrolysis catalyst. For example, such readily hydrolyzable groups as esters, enol ethers, ketals, oxides, and the like can frequently be maintained intact in the molecule during the hydrolysis. This advantage is of particular importance in the synthesis of adrenal cortical and related steroid hormones since selective reactions frequently permit the choice of shorter routes, involving a lesser number of steps, to the production of a physiologically active steroid. Moreover, the mild hydrolysis conditions usually result in the production of higher yields of desired 3-keto steroid than using added hydrolysis catalyst, e. g., hydrochloric acid, acetic acid and potassium acetate, sulfuric acid, or the like. This is particularly true in the case of highly substituted steroids possessing an 11$\beta$-hydroxy group, double bonds, oxides, enol esters or ethers, ketals, or the like in the molecule.

Steroid enamines which may be hydrolyzed according to the method of the present invention include those steroids wherein the amino group is pyrrolidyl, alkyl substituted pyrrolidyl, piperidyl, morpholino, dibenzylamino, diethylamino, preferably pyrrolidyl, and which may have, for example, besides the double bond alpha to the nitrogen atom, additional double bonds in the nucleus or side chain, a hydroxy or keto group at the 7, 11 or 20 position of the nucleus, a 17- or 21-hydroxy or acyloxy group, an oxide at the 5(6), 9(11) or 16(17) position, or combinations of these or other substituents such as, for example, the 3-enamine of coprastanone, 7,22-ergostradiene-3-one, cholestanone, sitostanone, stigmastanone, 3-keto-bisnorcholanaldehyde, the methyl and other aliphatic esters of 3-ketobisnorcholanic acid and 3-ketoetiocholanic acid, androstanedione, etiocholanedione, 17-hydroxyetiocholane-3-one, pregnane-3,20-dione, pregnane-3,11,20-trione, 11$\alpha$-hydroxypregnane-3,20-dione, 11$\beta$-hydroxypregnane-3,20-dione, 11$\beta$,17$\alpha$,21-trihydroxypregnane-3,20-dione, 17$\alpha$,21-dihydroxypregnane-3,11,20-trione, 21-acetoxypregnane-3,20-dione, wherein the amino group is pyrrolidyl, piperidyl, morpholinyl, dibenzylamino, diethylamino, or the like, preferably pyrrolidyl.

In carrying out the process of the present invention, a steroid 3-enamine I is partially or completely dissolved in an essentially neutral solvent containing water or to which water is then added to affect the hydrolysis. Heating the mixture accelerates the hydrolysis and frequently, under these conditions, only a few minutes of heating are necessary. Satisfactory results can be achieved at room temperature also, and the reaction temperature, within normal limits, does not appear to be critical. The water-miscible organic solvents are preferred since more efficient contact of the water with the enamine is possible than with a water-immiscible organic solvent. The lower-alcohols appear to be better solvents for the starting 3-enamines and are therefore the preferred solvents, with methanol and ethanol being preferred.

The hydrolysis reaction theoretically requires one mole of water per mole of starting steroid enamine. The use of less than one molar equivalent of water will therefore result in incomplete hydrolysis. Usually a substantial molar equivalent of water is employed in the reaction. Since steroid 3-enamines are frequently only sparingly soluble in the common organic solvents, the reaction is sometimes started with only a portion of the enamine in solution. This, however, provides a method of checking the progress of the reaction since the hydrolyzed steroid is usually more soluble in the mixture and the solution usually becomes homogeneous when the reaction is substantially complete.

The hydrolysis of steroid 3-enamines which comprises the present invention is of value without regard to the particular enamine group or other groups which may be a part of the steroid's nucleus or side chain, although it is to be understood that under certain conditions reactions may sometimes accompany the hydrolysis and thereby somewhat alter the composition of the radicals of the steroid. The starting steroid enamine is preferably a 3-pyrrolidyl enamine since this group readily hydrolyzes under the conditions of the reaction either at about room temperature or at elevated temperatures.

The following examples are illustrative of the process of the present invention and the products thus-produced, but are not to be construed as limiting.

*Example 1.—Hydrolysis of 3-pyrrolidyl-3-cholestene*

3-pyrrolidyl-3-cholestene was dissolved in hot aqueous 95 percent ethanol and the resulting mixture refluxed for five minutes. The solvent was then distilled and the residue washed with cold dilute hydrochloric acid. The dried residue represented a quantitative yield of cholestane-3-one melting at 128 degrees centigrade.

*Example 2.—Hydrolysis of 3-pyrrolidyl-3-pregnene-20-one*

Following the procedure described in Example 1, dissolving 3-pyrrolidyl-3-pregnene-20-one (prepared by reacting pregnane-3,20-dione with pyrrolidine in the presence of para-toluenesulfonic acid) in methanol containing five percent water and allowing the resulting solution to stand at room temperature for four hours, substantially hydrolyzes the enamine to pregnane-3,20-dione.

*Example 3.—Hydrolysis of 3-pyrrolidyl-3-pregnene-20-ol*

Reacting pregnane-3,20-dione wih about one molar equivalent of pyrrolidine in benzene and in the presence of para-toluenesulfonic acid is productive of 3-pyrrolidyl-3-pregnene-20-one which, when reacted with lithium aluminum hydride in ether followed by decomposition of the reaction mixture with water, is converted to 3-pyrrolidyl-3-pregnene-20-ol. Dissolving 3-pyrrolidyl-3-pregnene-20-ol in acetone containing five percent water and refluxing the mixture for several minutes hydrolyzes the amine to pyrrolidine and 3-ketopregnane-20-ol.

*Example 4.—Hydrolysis of 3-pyrrolidyl-3-pregnene-11β,17α,20,21-tetrol*

Reacting dihydrocortisone (17α,21-dihydroxypregnane-3,11,20-trione) with about one molar equivalent of pyrrolidine in benzene and in the presence of para-toluenesulfonic acid and with concomitant removal of the water of reaction is productive of 3-pyrrolidyl-17α,21-dihydroxy-3-pregnene-11,20-dione which, when reacted in ether with lithium aluminum hydride followed by decomposition of the mixture with water, is converted to 3-pyrrolidyl-3-pregnene-11β,17α,20,21-tetrol. Suspending 3-pyrrolidyl-3-pregnene-11β,17α,20,21-tetrol in refluxing tetrahydrofuran containing five percent water for one hour substantially hydrolyzes the enamine to 11β,17α,20,21-tetrahydroxypregnane-3-one.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A process for the production of a 3-keto steroid selected from cholestane and pregnane compounds which comprises: mixing a 3-tertiary amino steroid selected from cholestene and pregnene compounds, having an unconjugated double bond alpha to the amino nitrogen atom, with an essentially neutral organic solvent containing water to produce a secondary amine and said 3-keto steroid compound.

2. The process of claim 1 wherein the starting 3-tertiary amino steroid is a 3-pyrrolidyl steroid selected from cholestene and pregnene compounds.

3. The process of claim 1 wherein the starting 3-tertiary amino steroid is a 3-pyrrolidyl-3-pregnene compound.

4. The process of claim 1 wherein the reaction is carried out at a temperature substantially above room temperature.

5. The process of claim 1 wherein the organic solvent includes a water-miscible solvent.

6. A process for the production of a 3-keto steroid selected from cholestane and pregnane compounds which comprises: mixing a 3-pyrrolidyl steroid selected from cholestene and pregnene compounds, having an unconjugated double bond alpha to the pyrrolidyl nitrogen atom, with an essentially neutral organic solvent containing water and a lower-alkanol, at a temperature sugstantially above room temperature, to produce pyrrolidine and an A ring-saturated 3-keto steroid.

7. The process of claim 6 wherein the organic solvent is methanol.

8. The process of claim 6 wherein the starting steroid pyrrolidyl enamine is a pregnane compound.

References Cited in the file of this patent

Fieser et al.: Natural Product Related to Phenanthrene, 3rd ed., pp. 424–426 (1949).

Mannich: Berichte 69B, 2106–12 (1936).